US011281327B2

(12) United States Patent
Song et al.

(10) Patent No.: US 11,281,327 B2
(45) Date of Patent: Mar. 22, 2022

(54) TOUCH SUBSTRATE, METHOD OF DRIVING THE SAME AND TOUCH DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Jie Song, Beijing (CN); Qiyu Shen, Beijing (CN); Honggang Gu, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 61 days.

(21) Appl. No.: 16/641,397

(22) PCT Filed: Jul. 25, 2019

(86) PCT No.: PCT/CN2019/097663
§ 371 (c)(1),
(2) Date: Feb. 24, 2020

(87) PCT Pub. No.: WO2020/020280
PCT Pub. Date: Jan. 30, 2020

(65) Prior Publication Data
US 2020/0183564 A1 Jun. 11, 2020

(30) Foreign Application Priority Data
Jul. 26, 2018 (CN) .......................... 201810835692.X

(51) Int. Cl.
*G06F 3/041* (2006.01)
*G06F 3/044* (2006.01)
*G06K 9/00* (2022.01)

(52) U.S. Cl.
CPC ........ *G06F 3/04166* (2019.05); *G06F 3/0446* (2019.05); *G06K 9/0002* (2013.01)

(58) Field of Classification Search
CPC .. G06F 3/04166; G06F 3/0446; G06K 9/0002
See application file for complete search history.

(56) References Cited

U.S. PATENT DOCUMENTS 10,767,085 B2* 9/2020 Fujiwara .................... C09J 9/02
2012/0169628 A1 7/2012 Kuo et al.
(Continued)

FOREIGN PATENT DOCUMENTS

| CN | 102135833 A | 7/2011 |
| CN | 102436325 A | 5/2012 |

(Continued)

OTHER PUBLICATIONS

First Office Action for Chinese Application No. 201810835692.X, dated Dec. 3, 2019, 6 Pages.
(Continued)

*Primary Examiner* — Sejoon Ahn
(74) *Attorney, Agent, or Firm* — Brooks Kushman P.C.

(57) ABSTRACT

A touch substrate, a method of driving the same, and a touch display device are provided, and the touch substrate includes: a plurality of emitting electrode patterns arranged along a first direction, wherein the emitting electrode patterns includes an emitting electrode sub-pattern or a plurality of electrically connected emitting electrode sub-patterns; a plurality of first receiving electrode patterns arranged along a Y-direction, wherein the first receiving electrode patterns includes a plurality of electrically connected first receiving electrode sub-patterns; a plurality of second receiving electrode patterns arranged along an X-direction and insulated from the first receiving electrode pattern, and the second receiving electrode pattern includes a plurality of second (Continued)

receiving electrode sub-patterns electrically connected in sequence; the first direction intersecting both the X-direction and the Y-direction.

13 Claims, 5 Drawing Sheets

(56) References Cited

U.S. PATENT DOCUMENTS

| | | |
|---|---|---|
| 2014/0009428 A1 | 1/2014 | Coulson et al. |
| 2015/0075959 A1 | 3/2015 | Lu et al. |
| 2016/0162084 A1 | 6/2016 | Wang et al. |
| 2017/0052645 A1 | 2/2017 | Hur |
| 2017/0124381 A1 | 5/2017 | Liu et al. |
| 2017/0131816 A1 | 5/2017 | Zou et al. |
| 2017/0262683 A1 | 9/2017 | Li et al. |
| 2017/0277341 A1 | 9/2017 | Lim et al. |
| 2019/0018535 A1 | 1/2019 | Kitamura |
| 2019/0369803 A1* | 12/2019 | Yang ............... G06F 3/0418 |
| 2019/0369804 A1* | 12/2019 | Jung ............... G06F 3/044 |
| 2019/0369812 A1* | 12/2019 | Narita ............... B32B 15/08 |
| 2020/0183564 A1 | 6/2020 | Song et al. |

FOREIGN PATENT DOCUMENTS

| | | |
|---|---|---|
| CN | 104428741 A | 3/2015 |
| CN | 104461109 A | 3/2015 |
| CN | 104571756 A | 4/2015 |
| CN | 104808886 A | 7/2015 |
| CN | 105138988 A | 12/2015 |
| CN | 105446547 A | 3/2016 |
| CN | 105760016 A | 7/2016 |
| CN | 106383621 A | 2/2017 |
| CN | 106527821 A | 3/2017 |
| CN | 106843620 A | 6/2017 |
| CN | 106990868 A | 7/2017 |
| CN | 109002214 A | 12/2018 |
| WO | 2017134718 A1 | 8/2017 |

OTHER PUBLICATIONS

International Search Report and Written Opinion for Application No. PCT/CN2019/097663, dated Oct. 24, 2019, 9 Pages.
$1^{st}$ Chinese Office Action, English Translation.
International Search Report and Written Opinion, English Translation.
CN102135833A, English Abstract and U.S. Equivalent U.S. Pub. No. 2012/0169628.
CN102436325A, English Abstract and Machine Translation.
CN104428741A, English Abstract and U.S. Equivalent U.S. Pub. No. 2014/0009428.
CN104461109A, English Abstract and U.S. Equivalent U.S. Pub. No. 2015/0075959.
CN104571756A, English Abstract and U.S. Equivalent U.S. Pub. No. 2016/0162084.
CN104808886A, English Abstract and U.S. Equivalent U.S. Pub. No. 2017/0124381.
CN105138988A, English Abstract and U.S. Equivalent U.S. Pub. No. 2017/0262683.
CN105446547A, English Abstract and Machine Translation.
CN105760016A, English Abstract and Machine Translation.
CN106383621A, English Abstract and U.S. Equivalent U.S. Pub. No. 2017/0131816.
CN106527821A, English Abstract and Machine Translation.
CN106843620A, English Abstract and Machine Translation.
CN106990868A, English Abstract and Machine Translation.
CN109002214A, English Abstract and U.S. Equivalent U.S. Pub. No. 2020/0183564.
WO2017134718A1, English Abstract and U.S. Equivalent U.S. Pub. No. 2019/0018535.

* cited by examiner

TOUCH SUBSTRATE, METHOD OF DRIVING THE SAME AND TOUCH DISPLAY DEVICE

CROSS-REFERENCE TO RELATED APPLICATION APPLICATIONS

This application is the U.S. national phase of PCT Application No. PCT/CN2019/097663 filed on Jul. 25, 2019, which claims priority to Chinese Patent Application No. 201810835692.X, filed on Jul. 26, 2018, which are incorporated herein by reference in their entireties.

TECHNICAL FIELD

The present disclosure relates to the technical field of touch, and in particular to a touch substrate, a method of driving the same, and a touch display device.

BACKGROUND

With the continuous development of touch display technology, the application fields of touch screens have been widely used. The sensitivity and response time of touch screens have attracted widespread attention as important factors affecting user experience. At present, the response speed of the touch screen is generally between 50 milliseconds and 100 milliseconds. That is, when the touch screen is operated to input information, the response of the computer is much slower than the movement of the fingertips. This kind of reaction speed is obviously affecting the use when operations such as dragging a large amount of data, etc., are operated, resulting in a poor user experience.

In addition, when the touch screen is applied for fingerprint detection, a self-capacitive touch structure is usually adopted in traditional capacitive fingerprint recognition technology, in which ridges of the fingerprint directly contacts the surface of the touch screen, and there are air gaps between fingerprint valleys and the touch screen. The unevenness of the fingerprint causes the corresponding capacitance to be different. The touch screen forms the final fingerprint image by detecting the difference in capacitance between the corresponding position of the finger valley and the ridge, but the accuracy of fingerprint detection still needs to be improved.

SUMMARY

The present disclosure provides the following technical solutions.

In a first aspect, a touch substrate is provided in the present disclosure, including:

a plurality of emitting electrode patterns arranged along a first direction, where each of the emitting electrode patterns includes an emitting electrode sub-pattern or a plurality of electrically connected emitting electrode sub-patterns;

a plurality of first receiving electrode patterns arranged along a Y-direction, where each of the first receiving electrode patterns includes a plurality of electrically connected first receiving electrode sub-patterns; and a plurality of second receiving electrode patterns arranged along an X-direction and insulated from the first receiving electrode patterns, and the second receiving electrode pattern includes a plurality of electrically connected second receiving electrode sub-patterns;

where the first direction intersects both the X-direction and the Y-direction, and the X-direction is perpendicular to the Y-direction;

where each of the emitting electrode sub-patterns corresponds to at least one of the first receiving electrode sub-patterns and at least one of the second receiving electrode sub-patterns, an orthographic projection of the first receiving electrode sub-pattern onto a base substrate of the touch substrate and an orthographic projection of the corresponding second receiving electrode sub-pattern onto the base substrate are independent from each other, and at least partially overlap with an orthographic projection of the corresponding emitting electrode sub-pattern onto the base substrate respectively.

Optionally, the orthographic projection of the first receiving electrode sub-pattern onto the base substrate of the touch substrate and the orthographic projection of the second receiving electrode sub-pattern onto the base substrate are both located inside the orthographic projection of the corresponding emitting electrode sub-pattern onto the base substrate.

Optionally, in a region of the orthographic projection of the emitting electrode sub-pattern onto the base substrate, the orthographic projection of the corresponding first receiving electrode sub-pattern onto the base substrate of the touch substrate is complementary to the orthographic projection of the corresponding second receiving electrode sub-pattern onto the base substrate.

Optionally, the emitting electrode sub-patterns, the first receiving electrode sub-patterns and the second receiving electrode sub-patterns are all rectangular.

Optionally, the emitting electrode sub-patterns are rectangular, rhombic and/or triangular, the first receiving electrode sub-patterns and the second receiving electrode sub-patterns are both triangular.

Optionally, the touch substrate further includes:

a plurality of first receiving signal transmission lines correspondingly connected to the plurality of first receiving electrode patterns respectively;

a plurality of second receiving signal transmission lines correspondingly connected to the plurality of second receiving electrode patterns respectively; and a plurality of drive signal transmission lines correspondingly connected to the plurality of emitting electrode patterns respectively;

where a quantity of the drive signal transmission lines is equal to a sum of a quantity of the first receiving signal transmission lines and a quantity of the second receiving signal transmission lines minus 1.

Optionally, a first connection portion is between two adjacent first receiving electrode sub-patterns in a same first receiving electrode pattern, a second connection portion is between two adjacent second receiving electrode sub-patterns in a same second receiving electrode pattern, in an overlapping region of an orthographic projection of the first connection portion onto the base substrate and an orthographic projection of the second connection portion onto the base substrate, an insulation pad is arranged between the first connection portion and the second connection portion.

Optionally, an insulation layer is arranged between the first receiving electrode pattern and the second receiving electrode pattern.

In a second aspect, a touch display device including the touch substrate hereinabove is further provided in the present disclosure.

In a third aspect, a method of driving a touch substrate applied to drive the touch substrate hereinabove is further provided in the present disclosure, including:

transmitting a drive signal to the emitting electrode pattern;

acquiring touch sensing signals through the first receiving electrode pattern and the second receiving electrode pattern; and determining a touch position according to the touch sensing signals respectively acquired through the first receiving electrode pattern and the second receiving electrode pattern.

Optionally, the first receiving electrode pattern and the second receiving electrode pattern simultaneously acquire the touch sensing signals.

Optionally, prior to the transmitting the drive signal to the emitting electrode pattern, the driving method further includes:

determining a quantity of touch points;

in the case that the quantity of the touch points is one, the transmitting the drive signal to the emitting electrode pattern includes:

transmitting the drive signal to all the emitting electrode patterns on the touch substrate simultaneously.

Optionally, prior to the transmitting the drive signal to the emitting electrode pattern, the driving method further includes:

determining a quantity of touch points;

in the case that the quantity of the touch points is more than one, taking an i-th emitting electrode pattern and an i+round[(M+N−1)/2]-th emitting electrode pattern on the touch substrate as a group to obtain a plurality of groups of emitting electrode patterns; where the M represents a quantity of the second receiving electrode patterns, the N represents a quantity of the first receiving electrode patterns, and the (M+N−1) represents a quantity of the emitting electrode patterns;

the transmitting the drive signal to the emitting electrode pattern includes:

transmitting the drive signal to each of the groups of emitting electrode patterns in sequence, and simultaneously transmitting, when transmitting the drive signal to each of the groups of emitting electrode patterns, the drive signal to two emitting electrode patterns in the group.

BRIEF DESCRIPTION OF THE DRAWINGS

The drawings described herein are used to provide a further understanding of the present disclosure and constitute a part of the present disclosure. The embodiments of the present disclosure and the description thereof are used to explain the present disclosure, and do not constitute an improper limitation on the present disclosure. In the drawings.

DETAILED DESCRIPTION

In order to further explain the touch substrate, the method of driving the same, and the touch display device provided by the embodiments of the present disclosure, the following describes in detail with reference to the accompanying drawings of the description.

Figure 1:
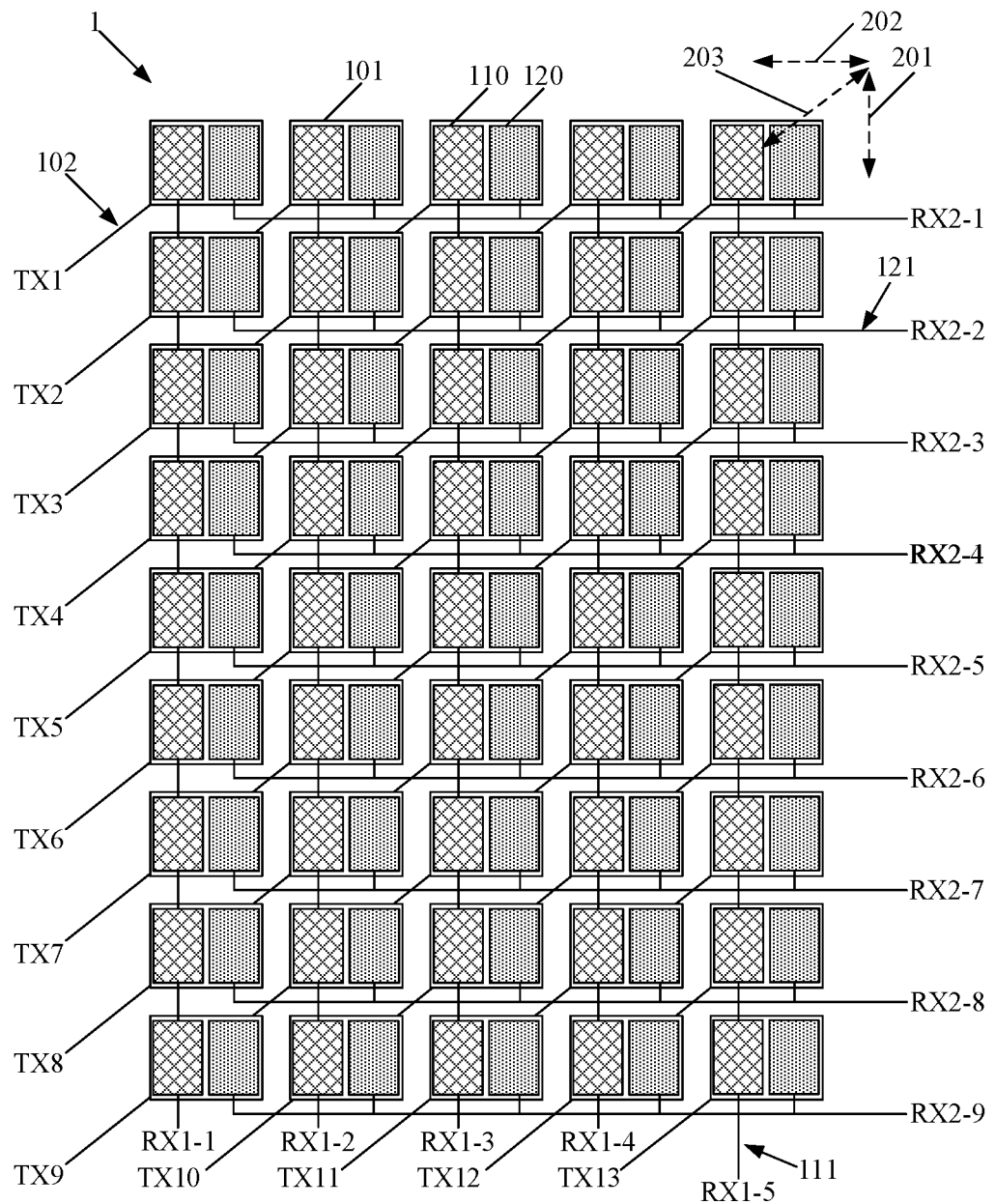
FIG. 1 is a first schematic structural diagram of a touch substrate provided in an embodiment of the present disclosure.
Figure 5:
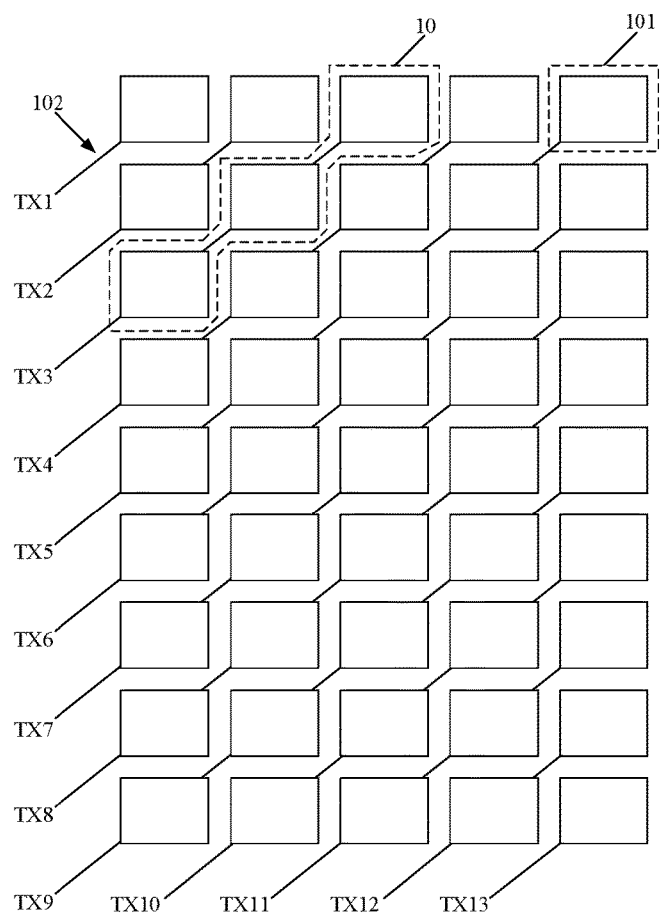
FIG. 5 is a schematic diagram of forming an emitting electrode pattern provided in an embodiment of the present disclosure.
Figure 6:
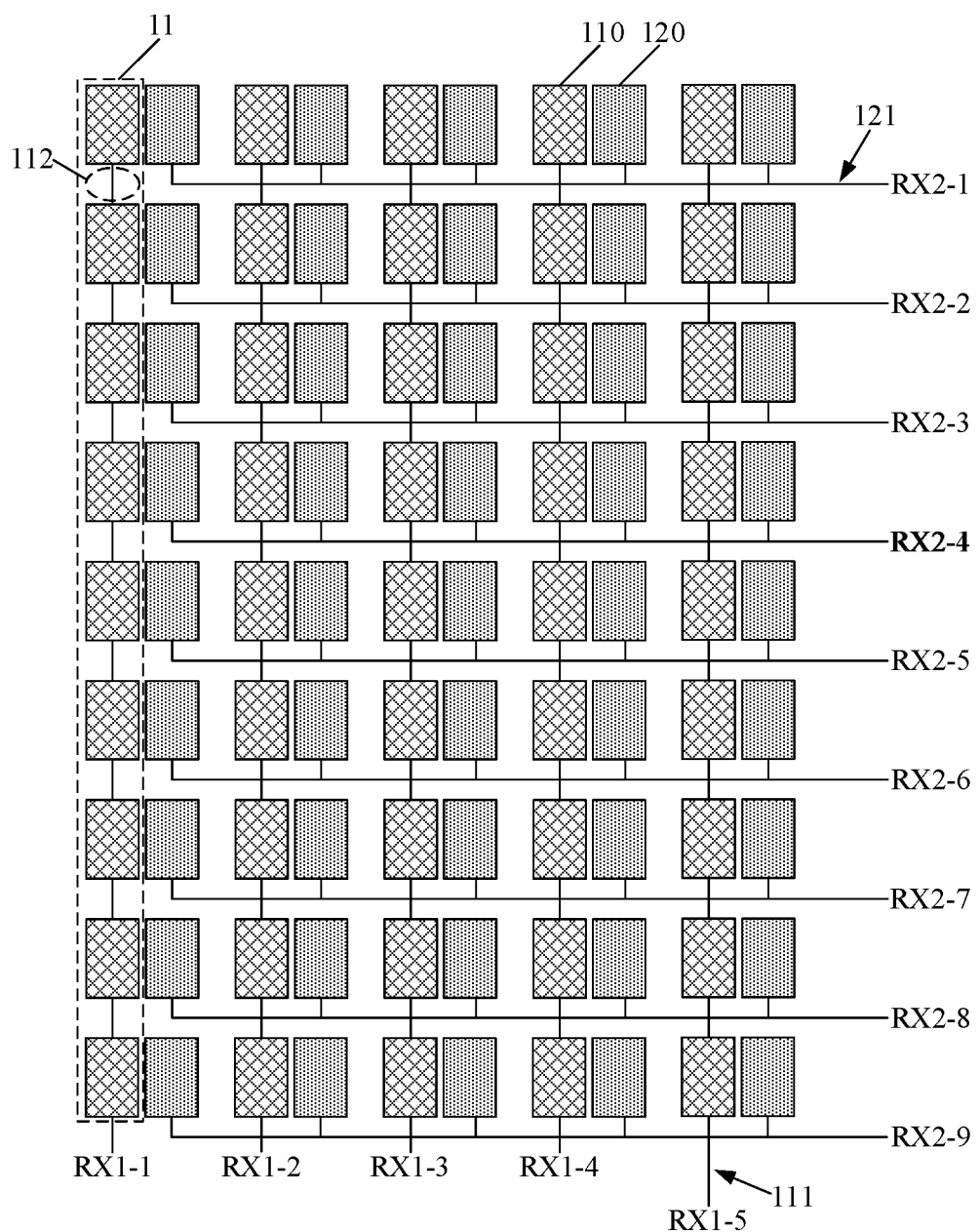
FIG. 6 is a schematic diagram of forming a receiving electrode pattern provided in an embodiment of the present disclosure.
Figure 7:
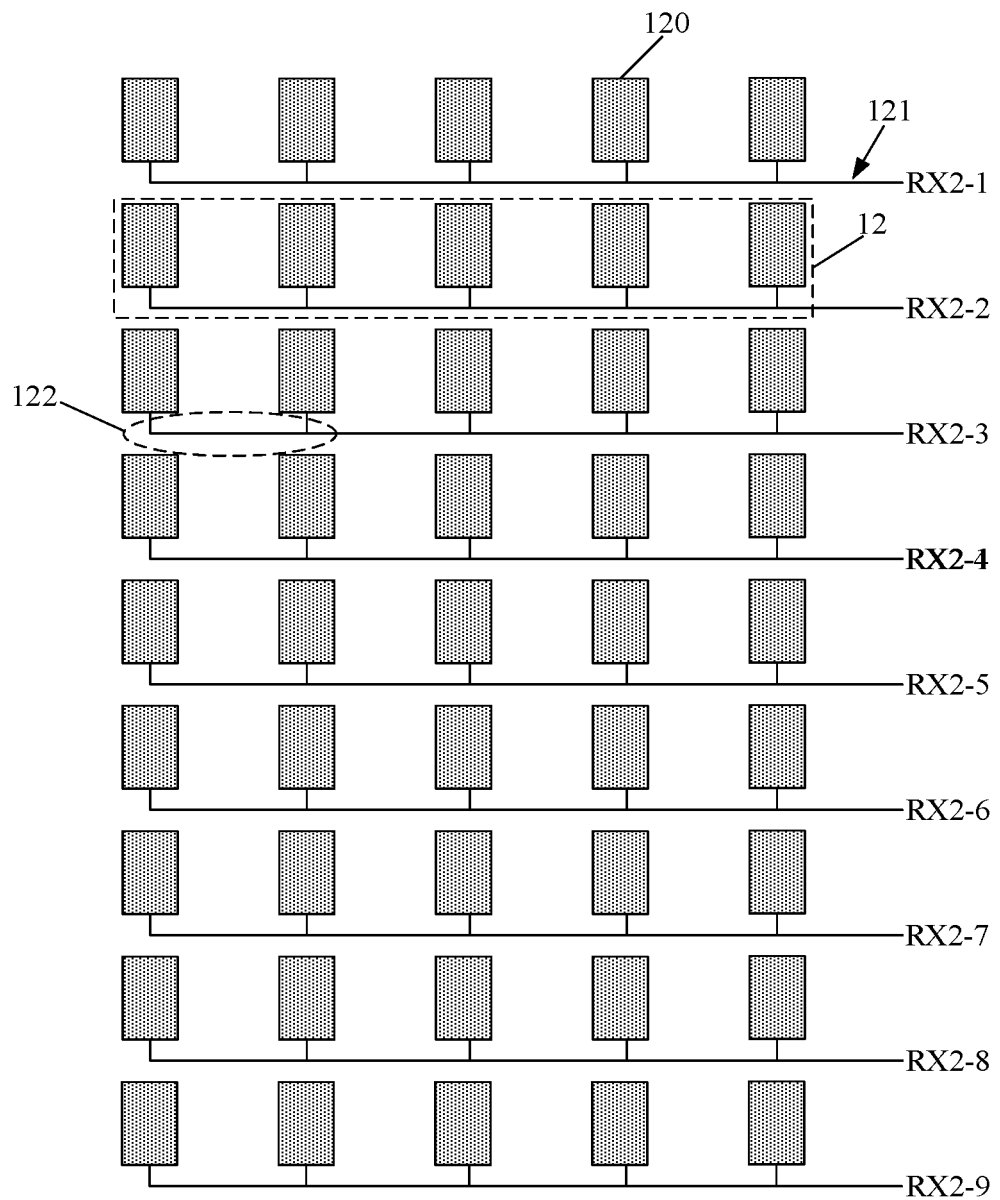
FIG. 7 is a schematic diagram of forming a second receiving electrode pattern provided in an embodiment of the present disclosure.

Referring to FIG. 1 and FIG. 5, a touch substrate 1 provided in an embodiment of the present disclosure includes: a plurality of emitting electrode patterns 10 arranged along a first direction 203, where each of the emitting electrode patterns 10 includes an emitting electrode sub-pattern 101 or a plurality of electrically connected emitting electrode sub-patterns 101; a plurality of first receiving electrode patterns 11 (as shown in FIG. 6) arranged along a Y-direction 201, where the first receiving electrode patterns 11 includes a plurality of electrically connected first receiving electrode sub-patterns 110; a plurality of second receiving electrode patterns 12 (as shown in FIG. 7) arranged along an X-direction 202 and insulated from the first receiving electrode patterns 11, and the second receiving electrode pattern 12 includes a plurality of electrically connected second receiving electrode sub-patterns 120; the first direction 203 intersects both the X-direction 202 and the Y-direction 201, and the X-direction 202 is perpendicular to the Y-direction 201; where the emitting electrode sub-patterns 101, the first receiving electrode sub-patterns 110 and the second receiving electrode sub-patterns 120 are in a one-to-one correspondence, an orthographic projection of the first receiving electrode sub-pattern 110 onto a base substrate of the touch substrate 1 and an orthographic projection of the corresponding second receiving electrode sub-pattern 120 onto the base substrate are independent from each other, and at least partially overlap with an orthographic projection of the corresponding emitting electrode sub-pattern 101 onto the base substrate respectively.

Optionally, when a touch operation is performed on the touch substrate 1, the working process of the touch substrate 1 is as follows.

Figure 3:
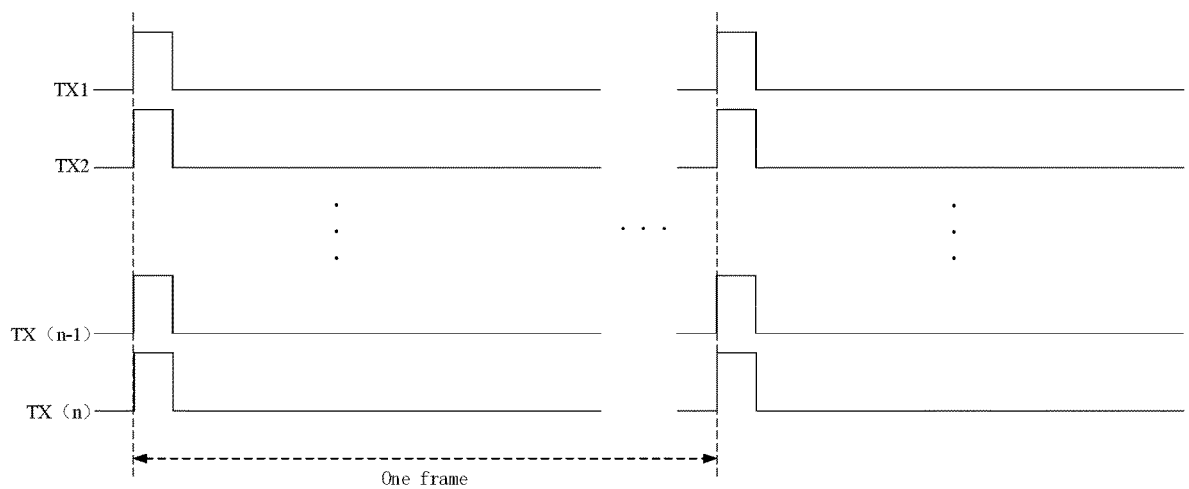
FIG. 3 is a diagram illustrating a driving timing of a touch substrate provided in an embodiment of the present disclosure.

When there is only one touch point, as shown in FIG. 3, a drive signal is transmitted to all the emitting electrode patterns 10 included on the touch substrate 1 simultaneously. The emitting electrode sub-pattern 101 in the emitting electrode pattern 10, the first receiving electrode sub-pattern 110 in the first receiving electrode pattern 11, and the second receiving electrode sub-pattern 120 in the second receiving electrode pattern 12 are in a one-to-one correspondence, and the orthographic projection of the first receiving electrode sub-pattern 110 onto the base substrate of the touch substrate 1 at least partially overlaps with the orthographic projection of the corresponding emitting electrode sub-pattern 101 onto the base substrate, the orthographic projection of the second receiving electrode sub-pattern 120 onto the base substrate at least partially overlaps with the orthographic projection of the corresponding emitting electrode sub-pattern 101 onto the base substrate, therefore, after a drive signal is transmitted to each emitting electrode pattern 10, mutual capacitance is generated between the corresponding emitting sub-pattern and the first receiving sub-pattern, and between the corresponding emitting sub-pattern and the second receiving sub-pattern; when a user touches the touch substrate 1 to generate a touch point, the mutual capacitance at the position of the touch point changes (generally, the mutual capacitance decreases after the finger touching), that is, touch sensing signals on the first receiving electrode sub-pattern 110 and the second receiving electrode sub-pattern 120 corresponding to the touch point change, in this way, by detecting the touch sensing signals on each of the first receiving electrode patterns 11 and each of the second receiving electrode patterns 12 (such as, detecting a voltage or a charge), a target first receiving electrode pattern where the touch sensing signal is changed on each of the first receiving electrode patterns 11 and a target second receiving electrode pattern where the touch sensing signal is changed on each of the second receiving electrode pattern 12 are determined, the position of the target first receiving electrode pattern and the target second receiving electrode pattern corresponding to the same emitting electrode sub-pattern 101 is the position of the touch point, and because the first receiving electrode pattern 11 and the second receiving electrode pattern 12 are respectively arranged along the Y-direction and the X-direction, therefore, the position of the touch point may be determined according to a Y coordinate value corresponding to the target first receiving electrode pattern and an X coordinate value corresponding to the target second receiving electrode pattern.

When there are a plurality of touch points, the i-th emitting electrode pattern 10 and the i+round[(M+N−1)/2]-th emitting electrode pattern 10 on the touch substrate 1 may be taken as a group to obtain a plurality of groups of the emitting electrode patterns, where the M represents a quantity of the second receiving electrode patterns 12 (as shown in FIG. 7), the N represents a quantity of the first receiving electrode patterns 11 (as shown in FIG. 6), and the (M+N−1) represents a quantity of the emitting electrode patterns 10 (as shown in FIG. 5); the drive signal is transmitted to each of the groups of emitting electrode patterns in sequence, and when the drive signal is transmitted to each of groups of emitting electrode patterns, the drive signal is simultaneously transmitted to two emitting electrode patterns included in the group; when a user touches the touch substrate 1 to generate a plurality of touch points, the mutual capacitance at the position of each touch point changes, that is, the touch sensing signals on the first receiving electrode sub-pattern 110 and the second receiving electrode sub-pattern 120 corresponding to each touch point change, in this way, by detecting the touch sensing signals on each of the first receiving electrode patterns 11 and each of the second receiving electrode patterns 12, a target first receiving electrode pattern where the touch sensing signal is changed on each of the first receiving electrode patterns 11 and a target second receiving electrode pattern where the touch sensing signal is changed on each of the second receiving electrode pattern 12 may be determined, the position of the target first receiving electrode pattern and the target second receiving electrode pattern corresponding to the same emitting electrode sub-pattern 101 is the position of the touch point, and because the first receiving electrode pattern 11 and the second receiving electrode pattern 12 are respectively arranged along the Y-direction and the X-direction, therefore, the position of the touch point may be determined according to the Y coordinate value corresponding to the target first receiving electrode pattern and the X coordinate value corresponding to the target second receiving electrode pattern.

Figure 4:
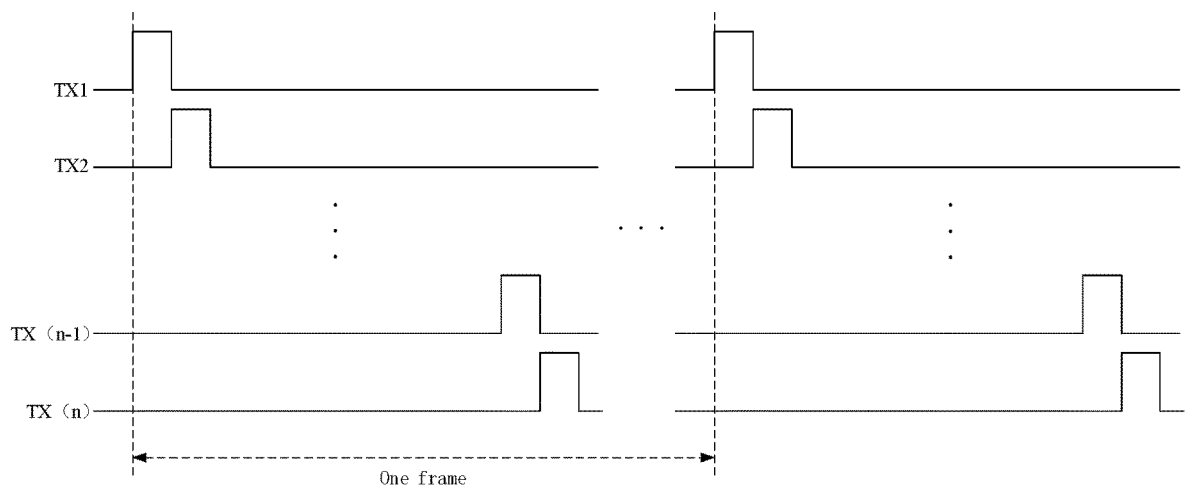
FIG. 4 is a diagram illustrating a driving timing of a touch substrate in the related art.

It is found from the structure of the touch substrate and the process of the touch operation performed by the touch substrate provided in the foregoing embodiment, according to the touch substrate provided in the embodiment of the present disclosure, where there is only one touch point, a drive signal may be transmitted to all the emitting electrode patterns 10 included in the touch substrate 1 simultaneously, that is, scanning all the emitting electrode patterns 10 in the touch substrate 1 simultaneously, as compared with scanning all the emitting electrode patterns 10 one by one (as shown in FIG. 4) in the related art, the touch substrate 1 provided in the embodiment of the present disclosure may determine the touch point by only one scan, thereby greatly improving the response speed of the touch substrate 1.

For the case where there are a plurality of touch points, a drive signal may be transmitted to the i-th emitting electrode pattern 10 and the i+round [(M+N−1)/2]-th emitting electrode pattern 10 simultaneously, that is, the i-th emitting electrode pattern 10 and the i+round [(M+N−1)/2]-th emitting electrode pattern 10 are scanned simultaneously, compared with a traditional scanning mode, the quantity of scans in this scanning mode changes from M to (M+N−1)/2, and M>(N−1) may be acquired from (M+N−1)/2<M. That is, when the quantity of the second receiving electrode patterns 12 on the touch substrate 1 is greater than the quantity of the first receiving electrode patterns 11 minus one, the response speed of the touch substrate 1 provided in the embodiment of the present disclosure may be greatly improved. It should be noted that, as shown in FIG. 7, the quantity M of the second receiving electrode patterns 12 corresponds to the quantity of rows of electrodes in the touch substrate 1, as shown in FIG. 6, the quantity N of the first receiving electrode patterns 11 corresponds to half of the quantity of columns of electrodes in the touch substrate 1, therefore, for the case that there are a plurality of touch points, in order to improve the response speed, the touch substrate 1 must satisfy M>(N−1), that is, the touch substrate 1 is made into a rectangle; illustratively, the touch substrate 1 provided in the embodiment of the present disclosure is particularly suitable for an electronic device having a long-shaped screen, such as a mobile phone, etc.

It may be seen that, regardless of a single touch point or a plurality of touch points, according to the touch substrate 1 provided in the embodiment of the present disclosure, the response speed of the touch substrate 1 is improved and the user experience is improved compared to related art.

In addition, when a drive signal is transmitted to the emitting electrode pattern 10, the first receiving electrode pattern 11 and the second receiving electrode pattern 12 corresponding to the emitting electrode pattern 10 may simultaneously receive a sensing signal. Therefore, when a touch sensing signal is detected, the first receiving electrode pattern 11 and the second receiving electrode pattern 12 may be detected simultaneously, thereby further improving the response speed of the touch substrate 1.

Further, the orthographic projection of the first receiving electrode sub-pattern 110 onto the base substrate of the touch substrate 1 and the orthographic projection of the second receiving electrode sub-pattern 120 onto the base substrate provided in the above embodiment are both located inside the orthographic projection of the corresponding emitting electrode sub-pattern 101 onto the base substrate. It should be noted that the above-mentioned located inside the orthographic projection includes a case where at least part of the boundary of the orthographic projection of the first receiving electrode sub-pattern 110 onto the base substrate of the touch substrate 1 coincides with at least part of the boundary of the orthographic projection of the corresponding emitting electrode sub-pattern 101 onto the base substrate, and a case where at least part of the boundary of the orthographic projection of the second receiving electrode sub-pattern 120 onto the base substrate coincides with at least part of the boundary of the orthographic projection of the corresponding emitting electrode sub-pattern 101 onto the base substrate.

Optionally, the above-mentioned arrangement mode enables the first receiving electrode sub-pattern 110 and the second receiving electrode sub-pattern 120 to form a mutual capacitance only with the corresponding emitting electrode sub-pattern 101, but not form a mutual capacitance with other surrounding emitting electrode sub-pattern 101, so that when the position of the touch point is determined, the position of the touch point may be determined more accurately according to the detected touch sensing signal.

Further, in a region of the orthographic projection of the emitting electrode sub-pattern 101 onto the base substrate, the orthographic projection of the corresponding first receiving electrode sub-pattern 110 onto the base substrate of the touch substrate 1 is complementary to the orthographic projection of the corresponding second receiving electrode sub-pattern 120 onto the base substrate.

Optionally, in a region of the orthographic projection of the emitting electrode sub-pattern 101 onto the base substrate, the orthographic projection of the first receiving electrode sub-pattern 110 corresponding to the emitting electrode sub-pattern 101 onto the base substrate of the touch substrate 1 is arranged, which is complementary to the orthographic projection of the second receiving electrode sub-pattern 120 corresponding to the emitting electrode sub-pattern 101 onto the base substrate, so that the first receiving electrode sub-pattern 110 and the second receiving electrode sub-pattern 120 may be spliced to form approximately the corresponding emitting electrode sub-patterns 101, so that the first receiving electrode sub-pattern 110 and the second receiving electrode sub-pattern 120 form a mutual capacitance with only the corresponding emitting electrode sub-pattern 101, while the opposing area of the emitting electrode sub-pattern 101 to the corresponding first receiving electrode sub-pattern 110 and the opposing area of the emitting electrode sub-pattern 101 to the corresponding second receiving electrode sub-pattern 120 are maximized, and the touch sensitivity of the touch substrate 1 is further improved.

Figure 2:
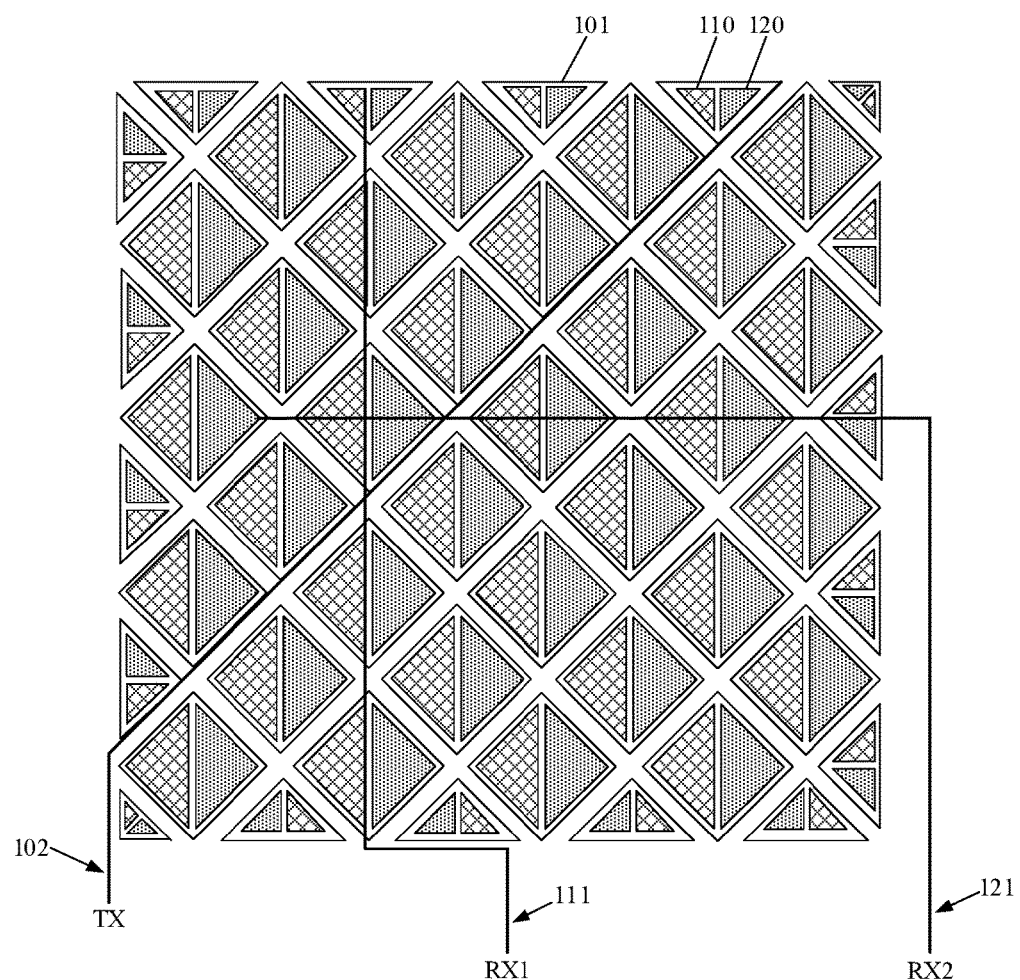
FIG. 2 is a second schematic structural diagram of a touch substrate provided in an embodiment of the present disclosure.

The shapes of the emitting electrode sub-pattern 101, the first receiving electrode sub-pattern 110, and the second receiving electrode sub-pattern 120 provided in the above embodiments are various. Illustratively, as shown in FIG. 1 and FIG. 2, the emitting electrode sub-pattern 101, the first receiving electrode sub-pattern 110, and the second receiving electrode sub-pattern 120 are all rectangular, or, the emitting electrode sub-pattern 101 is rectangular, rhombic and/or triangular, the first receiving electrode sub-pattern 110 and the second receiving electrode sub-pattern 120 are both triangular.

It should be noted that the touch substrate 1 provided in the embodiment of the present disclosure may be applied not only in the field of touch screens but also in the field of fingerprint recognition. When the touch substrate 1 provided in the embodiment of the present disclosure is applied in the field of fingerprint recognition, each emitting electrode sub-pattern 101 included in the emitting electrode pattern 10 corresponds to two receiving electrode sub-patterns, so that more fingerprint detection modules are formed on the touch substrate 1. Therefore, when the touch screen provided in the embodiment of the present disclosure is applied in the field of fingerprint recognition, the detected fingerprint pattern is clearer and is closer to the true fingerprint texture.

Further, as shown in FIG. 1, the touch substrate 1 provided in the foregoing embodiment further includes:

a plurality of first receiving signal transmission lines 111 correspondingly connected to the plurality of first receiving electrode patterns 11 respectively;

a plurality of second receiving signal transmission lines 121 correspondingly connected to the plurality of second receiving electrode patterns 12 respectively;

a plurality of drive signal transmission lines 102 correspondingly connected to the plurality of emitting electrode patterns 10 respectively, where a quantity of the drive signal transmission lines 102 is equal to a sum of a quantity of the first receiving signal transmission lines 111 and a quantity of the second receiving signal transmission lines 121 minus 1.

Optionally, on the touch substrate 1 provided in the foregoing embodiment, each of the emitting electrode patterns 10 corresponds to a drive signal transmission line 102. When the touch substrate 1 is driven to work, the drive signal may be transmitted to the corresponding emitting electrode pattern 10 through the drive signal transmission line 102 (such as TX1-TX13 in FIG. 1); each of the first receiving electrode patterns 11 corresponds to a first receiving signal transmission line 111, and each of the second receiving electrode patterns 12 corresponds to a second receiving signal transmission line 121, the first receiving signal transmission line 111 and the second receiving signal transmission line 121 are configured to receive touch sensing signals on the corresponding first receiving electrode pattern 11 and the corresponding second receiving electrode pattern 12 respectively, the specific position of the touch point may be determined by detecting the touch sensing signals on each of the first receiving signal transmission lines 111 (such as RX1-1 to RX1-5 in FIG. 1) and the touch sensing signals on each of the second receiving signal transmission lines 121 (such as RX2-1 to RX2-9 in FIG. 1).

The first receiving electrode pattern 11 is arranged along the Y-direction, the second receiving electrode pattern 12 is arranged along the X-direction, and the emitting electrode pattern 10 is arranged along the first direction, and the first direction intersects both the X-direction and the Y-direction, thus, the above-mentioned emitting electrode pattern 10 is equivalent to being arranged obliquely, as shown in FIG. 1, a quantity of the drive signal transmission lines 102 corresponding to the emitting electrode pattern 10 is equal to a sum of a quantity of the first receiving signal transmission lines 111 and a quantity of the second receiving signal transmission lines 121 minus 1.

According to the technical solution of the present disclosure, each of the emitting electrode patterns 10 corresponds to a plurality of the Rx1 and a plurality of the Rx2, which may effectively reduce the quantity of pins connected to the emitting electrode pattern, and improve the curing yield of the UV adhesive during surface bonding. In addition, on the premise of maintaining the same quantity of pins, since the quantity of receiving electrode patterns corresponding to each of the emitting electrode patterns increases significantly, the quantity of channels for touch detection may be greatly increased, thereby improving touch detection accuracy.

Further, on the touch substrate 1 provided in the foregoing embodiment, there is a first connection portion 112 (as shown in FIG. 6) between two adjacent first receiving electrode sub-patterns 110 in a same first receiving electrode pattern 11, there is a second connection portion 122 (as shown in FIG. 7) between two adjacent second receiving electrode sub-patterns 120 in a same second receiving electrode pattern 12, in an overlapping region of an orthographic projection of the first connection portion 112 onto the base substrate and an orthographic projection of the second connection portion 122 onto the base substrate, an insulation pad is arranged between the first connection portion 112 and the second connection portion 122.

The specific structures of the first receiving electrode pattern 11 and the second receiving electrode pattern 12 are various. Illustratively, as shown in FIG. 1, there is a first connection portion 112 between two adjacent first receiving electrode sub-patterns 110 in a same first receiving electrode pattern 11, there is a second connection portion 122 between two adjacent second receiving electrode sub-patterns 120 in a same second receiving electrode pattern 12. When the first receiving electrode pattern 11 and the second receiving electrode pattern 12 are arranged on the same layer, the first connection portion 112 and the second connection portion 122 may cross. In order to avoid the short circuit problem caused by the intersection of the first connection portion 112 and the second connection portion 122, in an overlapping region of an orthographic projection of the first connection portion 112 onto the base substrate and an orthographic projection of the second connection portion 122 onto the base substrate, an insulation pad may be arranged between the first connection portion 112 and the second connection portion 122, the first connection portion 112 and the second connection portion 122 at the intersection are insulated by the insulation pad, so as to better ensure stable operation performance of the touch substrate 1.

It should be noted that, when there is a first overlapping region between the orthographic projection of the first connection portion 112 onto the base substrate and the orthographic projection of the second receiving signal transmission line 121 onto the base substrate, in the first overlapping region, the insulation pad is also arranged between the first connection portion 112 and the second receiving signal transmission line 121; similarly, when there is a second overlapping region between the orthographic projection of the second connection portion 122 onto the base substrate and the orthographic projection of the first receiving signal transmission line 111 onto the base substrate, in the second overlapping area, the insulation pad is also arranged between the second connection portion 122 and the first receiving signal transmission line 111.

In more detail, in the above-mentioned touch substrate 1, there is an insulation layer between the emitting electrode pattern 10 and the first receiving electrode pattern 11, and between the emitting electrode pattern 10 and the second receiving electrode pattern 12, to avoid a short circuit between the emitting electrode pattern 10 and the first receiving electrode pattern 11 or a short circuit between the emitting electrode pattern 10 and the second receiving electrode pattern 12. The first receiving electrode pattern 11 and the second receiving electrode pattern 12 may be arranged in a same layer or may be arranged in layers according to actual needs. Regardless of the setting method, the orthographic projection of the first receiving electrode pattern 11 onto the base substrate and the orthographic projection of the second receiving electrode pattern 12 onto the base substrate are required to be independent from each other.

In some embodiments, an insulation layer is arranged between the first receiving electrode pattern 11 and the second receiving electrode pattern 12.

Optionally, when the first receiving electrode pattern 11 and the second receiving electrode pattern 12 are arranged in different layers, an insulation layer is arranged between the first receiving electrode pattern 11 and the second receiving electrode pattern 12, to prevent a short circuit between the first receiving electrode pattern 11 and the second receiving electrode pattern 12 or a short circuit between the first receiving signal transmission line 111 and the second receiving signal transmission line 121, thereby better ensuring the operation stability of the touch substrate. In addition, the first receiving electrode pattern 11 and the second receiving electrode pattern 12 are arranged in different layers, and a structure of an insulation layer is arranged between the first receiving electrode pattern 11 and the second receiving electrode pattern 12, it is not necessary to leave an insulation gap between the corresponding first receiving electrode sub-pattern 110 and the second receiving electrode sub-pattern 120, so that the first receiving electrode sub-pattern 110 and the second receiving electrode sub-pattern 120 can have a larger area, which effectively increases the effective touch area of the touch substrate, and improves the touch sensitivity of the touch substrate 1.

A touch display device is further provided in an embodiment of the present disclosure, which includes the touch substrate provided in the foregoing embodiment.

The touch substrate provided in the foregoing embodiment may achieve faster response speed, better touch sensitivity, and more accurate determination of the position of the touch point, therefore, when the touch display device provided in the embodiment of the present disclosure includes the touch substrate provided in the above embodiment, the same beneficial effects are also provided, and details are not described herein.

When the touch substrate provided in the foregoing embodiment is manufactured, a manufacturing method includes:

providing a base substrate;

forming a plurality of emitting electrode patterns 10 arranged along a first direction onto the base substrate, where the emitting electrode pattern 10 includes an emitting electrode sub-pattern 101 or a plurality of electrically connected emitting electrode sub-patterns 101, as shown in FIG. 5; optionally, the emitting electrode layer may be first manufactured onto the base substrate, and then the emitting electrode layer may be patterned to obtain the emitting electrode pattern 10.

forming an insulation layer on a side of the emitting electrode pattern 10 facing away from the base substrate;

forming a plurality of the first receiving electrode patterns 11 arranged along the Y-direction and a plurality of the second receiving electrode patterns 12 arranged along the X-direction and insulated from the first receiving electrode patterns 11 on a side of the insulation layer facing away from the emitting electrode pattern 10, where the first receiving electrode pattern 11 includes a plurality of electrically connected first receiving electrode sub-patterns 110, and the second receiving electrode pattern 12 includes a plurality of electrically connected second receiving electrode sub-patterns 120; the first direction intersects both the X-direction and the Y-direction, as shown in FIG. 6 and FIG. 7;

where the emitting electrode sub-patterns 101, the first receiving electrode sub-patterns 110 and the second receiving electrode sub-patterns 120 are in a one-to-one correspondence, and the orthographic projection of the first receiving electrode sub-pattern 110 onto the base substrate of the touch substrate 1 at least partially overlaps with the orthographic projection of the corresponding emitting electrode sub-pattern 101 onto the base substrate, the orthographic projection of the second receiving electrode sub-pattern 120 onto the base substrate at least partially overlaps with the orthographic projection of the corresponding emitting electrode sub-pattern 101 onto the base substrate. The orthographic projection of the first receiving electrode sub-pattern 110 onto the base substrate and the orthographic projection of the corresponding second receiving electrode sub-pattern 120 onto the base substrate are independent from each other.

Optionally, a first receiving electrode layer may be first manufactured, and then the first receiving electrode layer may be patterned to obtain a first receiving electrode pattern 11; then a second receiving electrode layer may be manufactured and then a second receiving electrode layer may be patterned to obtain a second receiving electrode pattern 12.

It should be noted that, the specific structures of the first receiving electrode pattern 11 and the second receiving electrode pattern 12 are various. Illustratively, as shown in FIG. 6 and FIG. 7, there is a first connection portion 112 between two adjacent first receiving electrode sub-patterns 110 in a same first receiving electrode pattern 11, there is a second connection portion 122 between two adjacent second receiving electrode sub-patterns 120 in a same second receiving electrode pattern 12, when the first receiving electrode pattern 11 and the second receiving electrode pattern 12 are arranged on the same layer, the first connection portion 112 and the second connection portion 122 easily cause a short circuit, in order to avoid the above-mentioned short circuit, after the first receiving electrode pattern 11 is manufactured, an insulation layer may be manufactured again, and the insulation layer may be patterned to form a plurality of insulation pads, each of the insulation pads is in an overlapping region of an orthographic projection of the first connection portion 112 onto the base substrate and an orthographic projection of the second connection portion 122 onto the base substrate, after the insulation pad is manufactured, the second receiving electrode pattern 12 may be continuously manufactured, in this way, in an overlapping region of an orthographic projection of the first connection portion 112 onto the base substrate and an orthographic projection of the second connection portion 122 onto the base substrate, between the first connection portion 112 and the second connection portion 122, there is an insulation pad to isolate the first connection portion 112 and the second connection portion 122, a short circuit between the first receiving electrode pattern 11 and the second receiving electrode pattern 12 is well avoided.

It should be noted that the above-mentioned first receiving electrode pattern 11 and the second receiving electrode pattern 12 may also be arranged in layers, when the first receiving electrode pattern 11 and the second receiving electrode pattern 12 are arranged in layers, after the first receiving electrode pattern 11 is formed, an insulation layer covering the first receiving electrode pattern 11 is formed. There is no need to pattern the insulation layer, and it is sufficient to continue to form the second receiving electrode pattern 12 directly on the insulation layer.

Further, in the touch substrate manufactured by using the above manufacturing method, and the orthographic projection of the first receiving electrode sub-pattern 110 onto the base substrate of the touch substrate is located inside the orthographic projection of the corresponding emitting electrode sub-pattern 101 onto the base substrate, the orthographic projection of the second receiving electrode sub-pattern 120 onto the base substrate is located inside the orthographic projection of the corresponding emitting electrode sub-pattern 101 onto the base substrate.

Further, in the touch substrate 1 manufactured by using the above manufacturing method, in a region of the orthographic projection of the emitting electrode sub-pattern 101 onto the base substrate, the orthographic projection of the corresponding first receiving electrode sub-pattern 110 onto the base substrate of the touch substrate 1 is complementary to the orthographic projection of the corresponding second receiving electrode sub-pattern 120 onto the base substrate.

Further, in the touch substrate 1 manufactured by using the above manufacturing method, the emitting electrode sub-pattern 101, the first receiving electrode sub-pattern 110, and the second receiving electrode sub-pattern 120 are all rectangular; or, the emitting electrode sub-pattern 101 is rectangular, rhombic and/or triangular, the first receiving electrode sub-pattern 110 and the second receiving electrode sub-pattern 120 are both triangular. It should be noted that the specific shapes of the above-mentioned emitting electrode sub-pattern 101, the first receiving electrode sub-pattern 110, and the second receiving electrode sub-pattern 120 are not limited to the shapes given above, but may be selected from other shapes, such as hexagons, circles, etc.

Further, the manufacturing method further includes:

forming first receiving signal transmission lines 111 connected to the first receiving electrode patterns 11 in a one-to-one correspondence; forming second receiving signal transmission lines 121 connected to the second receiving electrode patterns 12 in a one-to-one correspondence; forming drive signal transmission lines 102 connected to the emitting electrode patterns 10 in a one-to-one correspondence; where a quantity of the drive signal transmission lines 102 is equal to a sum of a quantity of the first receiving signal transmission lines 111 and a quantity of the second receiving signal transmission lines 121 minus 1.

The touch substrate manufactured by using the above manufacturing method may achieve faster response speed, better touch sensitivity, and more accurate determination of the position of the touch point. For specific analysis, refer to the structural embodiment, and details are not described herein.

A method of driving a touch substrate configured to drive the touch substrate provided in the above embodiment is further provided in an embodiment of the present disclosure, including:

transmitting a drive signal to an emitting electrode pattern 10;

acquiring a touch sensing signal through a first receiving electrode pattern 11 and a second receiving electrode pattern 12;

determining a touch position according to the touch sensing signal respectively acquired through the first receiving electrode pattern 11 and the second receiving electrode pattern 12.

Further, the above driving method control the first receiving electrode pattern 11 and the second receiving electrode pattern 12 to obtain a touch sensing signal simultaneously;

Further, prior to transmitting the drive signal to the emitting electrode pattern 10, the driving method provided in the above embodiment further includes: determining a quantity of touch points.

It should be noted that the quantity of the touch points may be determined in advance according to the application scenario of the touch substrate, and the quantity of the touch points may include one or more.

Further, when there is only one touch point, as shown in FIG. 3, the transmitting the drive signal to the emitting electrode pattern 10 includes: transmitting a drive signal to all the emitting electrode patterns 10 included in the touch substrate 1 simultaneously.

Further, when there are a plurality of the touch points, an i-th emitting electrode pattern 10 and an i+round[(M+N−1)/2]-th emitting electrode pattern 10 on the touch substrate 1 are taken as a group to obtain a plurality of groups of emitting electrode patterns 10; where the M represents a quantity of the second receiving electrode patterns 12, the N represents a quantity of the first receiving electrode patterns 11, and the (M+N−1) represents a quantity of the emitting electrode patterns 10; the transmitting the drive signal to the emitting electrode pattern 10 includes: transmitting the drive signal to each of the groups of emitting electrode patterns 10 in sequence, and simultaneously transmitting, when transmitting the drive signal to each of groups of emitting electrode patterns 10, the drive signal to two emitting electrode patterns 10 included in the group.

In more detail, when the driving method provided in the embodiment of the present disclosure is adopted to drive the touch substrate 1, the specific driving process is as follows.

When there is only one touch point, a drive signal is transmitted to all the emitting electrode patterns 10 included in the touch substrate 1 simultaneously, since the emitting electrode sub-pattern 101 in the emitting electrode pattern 10, the first receiving electrode sub-pattern 110 in the first receiving electrode pattern 11, and the second receiving electrode sub-pattern 120 in the second receiving electrode pattern 12 are in a one-to-one correspondence, and the orthographic projection of the first receiving electrode sub-pattern 110 onto the base substrate of the touch substrate 1 at least partially overlaps with the orthographic projection of the corresponding emitting electrode sub-pattern 101 onto the base substrate, the orthographic projection of the second receiving electrode sub-pattern 120 onto the base substrate at least partially overlaps with the orthographic projection of the corresponding emitting electrode sub-pattern 101 onto the base substrate. Therefore, after a drive signal is transmitted to each emitting electrode pattern 10, mutual capacitance is generated between the corresponding emitting sub-pattern and the first receiving sub-pattern, and between the corresponding emitting sub-pattern and the second receiving sub-pattern; when a user touches the touch substrate to generate a touch point, the mutual capacitance at the position of the touch point changes (generally, the mutual capacitance decreases after the finger touches), that is, the touch sensing signals on the first receiving electrode sub-pattern 110 and the second receiving electrode sub-pattern 120 corresponding to the touch point change, in this way, by detecting the touch sensing signals on each of the first receiving electrode patterns 11 and each of the second receiving electrode patterns 12 (such as, detecting a voltage or a charge), a target first receiving electrode pattern where the touch sensing signal is changed on each of the first receiving electrode patterns 11 and a target second receiving electrode pattern where the touch sensing signal is changed on each of the second receiving electrode pattern 12 are determined, the position of the target first receiving electrode pattern and the target second receiving electrode pattern corresponding to the same emitting electrode sub-pattern 101 is the position of the touch point, and because the first receiving electrode pattern 11 and the second receiving electrode pattern 12 are respectively arranged along the Y-direction and the X-direction, therefore, the position of the touch point may be determined according to the Y coordinate value corresponding to the target first receiving electrode pattern and the X coordinate value corresponding to the target second receiving electrode pattern.

When there are a plurality of touch points, the i-th emitting electrode pattern 10 and the i+round[(M+N−1)/2]-th emitting electrode pattern 10 on the touch substrate may be taken as a group to obtain a plurality of groups of the emitting electrode patterns 10, where the M represents a quantity of the second receiving electrode patterns 12, the N represents a quantity of the first receiving electrode patterns 11, and the (M+N−1) represents a quantity of the emitting electrode patterns 10; the drive signal is transmitted to each of the groups of emitting electrode patterns in sequence, and when the drive signal is transmitted to each of groups of emitting electrode patterns, the drive signal is simultaneously transmitted to two emitting electrode patterns included in the group; when a user touches the touch substrate 1 to generate a plurality of touch points, the mutual capacitance at the position of each touch point changes, that is, the touch sensing signals on the first receiving electrode sub-pattern 110 and the second receiving electrode sub-pattern 120 corresponding to each touch point change, in this way, by detecting the touch sensing signals on each of the first receiving electrode patterns 11 and each of the second receiving electrode patterns 12, a target first receiving electrode pattern where the touch sensing signal is changed on each of the first receiving electrode patterns 11 and a target second receiving electrode pattern where the touch sensing signal is changed on each of the second receiving electrode pattern 12 may be determined, the position of the target first receiving electrode pattern and the target second receiving electrode pattern corresponding to the same emitting electrode sub-pattern 101 is the position of the touch point, and because the first receiving electrode pattern 11 and the second receiving electrode pattern 12 are respectively arranged along the Y-direction and the X-direction, therefore, the position of the touch point may be determined according to the Y coordinate value corresponding to the target first receiving electrode pattern and the X coordinate value corresponding to the target second receiving electrode pattern.

When the driving method provided in the embodiment of the present disclosure is adopted to drive the touch substrate 1, for a case where there is only one touch point, a drive signal is transmitted to all the emitting electrode patterns 10 included in the touch substrate 1 simultaneously, that is, scanning all the emitting electrode patterns 10 in the touch substrate 1 simultaneously, as compared with scanning all the emitting electrode patterns 10 one by one (as shown in FIG. 4) in the related art, the driving method provided in the embodiment of the present disclosure may realize determination of the touch point by only one scan, which greatly improves the response speed of the touch substrate 1.

For the case where there are a plurality of touch points, a drive signal may be transmitted to the i-th emitting electrode pattern 10 and the i+round [(M+N−1)/2]-th emitting electrode pattern 10 simultaneously, that is, the i-th emitting electrode pattern 10 and the i+round[(M+N−1)/2]-th emitting electrode pattern 10 are scanned simultaneously, compared with a traditional scanning mode, the quantity of scans in this scanning mode changes from the M to (M+N−1)/2, and M>(N−1) may be acquired from (M+N−1)/2<M. That is, when the quantity of the second receiving electrode patterns 12 on the touch substrate 1 is greater than the quantity of the first receiving electrode patterns 11 minus one, the response speed of the touch substrate 1 driven by using the driving method provided in the embodiment of the present disclosure may be greatly improved. In addition, for the case where there are a plurality of touch points, when the driving method provided in the embodiment of the present disclosure is adopted to drive the touch substrate 1 described above, the position of the touch point may be uniquely determined to avoid false points.

It may be seen that, when the driving method provided in the embodiment of the present disclosure is adopted to drive the touch substrate 1 described above, regardless of a single touch point or a plurality of touch points, the response speed of the touch substrate is improved and the user experience is improved compared to related art.

In addition, in the driving method provided in the embodiment of the present disclosure, when a drive signal is transmitted to the emitting electrode pattern 10, the first receiving electrode pattern 11 and the second receiving electrode pattern 12 corresponding to the emitting electrode pattern 10 may simultaneously receive a sensing signal. Therefore, when a touch sensing signal is detected, the first receiving electrode pattern 11 and the second receiving electrode pattern 12 may be detected simultaneously, thereby further improving the response speed of the touch substrate.

Each embodiment in the present specification is described in a progressive manner, and the same or similar parts between the various embodiments may be referred to each other. Each embodiment focuses on the differences from other embodiments. In particular, as for the method embodiment, since it is basically similar to the product embodiment, it is described relatively simply, and the relevant part may refer to the description of the product embodiment.

Unless defined otherwise, technical and scientific terms used in the present disclosure have common meaning understood by those of ordinary skill in the art to which the present disclosure belong. The terms "first", "second", and the like used in the present disclosure do not indicate any order, any quantity, or any importance, but are only used to distinguish different components. Words such as "include" or "comprise" mean that the elements or items appear before the word cover elements or items appear after the word and the equivalent thereof without excluding other elements or items. Words such as "connected" or "connecting" are not limited to physical or mechanical connections, but may include electrical connections, and refer to either direct or indirect. "Up", "down", "left", "right", etc. are only used to indicate the relative position relationship. When the absolute position of the described object changes, the relative position relationship may also change accordingly.

It may be understood that when an element such as a layer, a film, a region, or a substrate is referred to as being located "on" or "under" another element, it can be "directly" located "on" or "under" the other element, or intervening elements may also be present.

In the description of the foregoing embodiments, specific features, structures, materials, or characteristics may be combined in a suitable manner in any one or more embodiments or examples.

The aforementioned are merely embodiments of the present disclosure, but the scope of the disclosure is by no means limited thereto. Any modifications or substitutions that would easily occur to those skilled in the art, without departing from the technical scope disclosed in the disclosure, should be encompassed in the scope of the present disclosure. Therefore, the scope of the present disclosure is to be determined by the scope of the claims.

What is claimed is:

1. A touch substrate, comprising:
a plurality of emitting electrode patterns arranged along a first direction, wherein each of the emitting electrode patterns comprises an emitting electrode sub-pattern or a plurality of electrically connected emitting electrode sub-patterns;
a plurality of first receiving electrode patterns arranged along a Y-direction, wherein each of the first receiving electrode patterns comprises a plurality of electrically connected first receiving electrode sub-patterns; and
a plurality of second receiving electrode patterns arranged along an X-direction and insulated from the first receiving electrode patterns, and each of the second receiving electrode patterns comprises a plurality of electrically connected second receiving electrode sub-patterns;
wherein the first direction intersects both the X-direction and the Y-direction, and the X-direction is perpendicular to the Y-direction;
wherein each of the emitting electrode sub-patterns corresponds to at least one of the first receiving electrode sub-patterns and at least one of the second receiving electrode sub-patterns, an orthographic projection of the at least one of the first receiving electrode sub-patterns onto a base substrate of the touch substrate and an orthographic projection of the at least one of the second receiving electrode sub-patterns onto the base substrate are independent from each other, and both of the orthographic projection of the at least one of the first receiving electrode sub-patterns onto the base substrate of the touch substrate and the orthographic projection of the at least one of the second receiving electrode sub-patterns onto the base substrate at least partially overlap with an orthographic projection of the corresponding emitting electrode sub-pattern onto the base substrate respectively.

2. The touch substrate according to claim 1, wherein the orthographic projection of the at least one of the first receiving electrode sub-patterns onto the base substrate of the touch substrate and the orthographic projection of the at least one of the second receiving electrode sub-patterns onto the base substrate are both located inside the orthographic projection of the corresponding emitting electrode sub-pattern onto the base substrate.

3. The touch substrate according to claim 2, wherein in a region of the orthographic projection of the emitting electrode sub-pattern onto the base substrate, the orthographic projection of the at least one of the first receiving electrode sub-patterns onto the base substrate of the touch substrate is complementary to the orthographic projection of the at least one of the second receiving electrode sub-patterns onto the base substrate.

4. The touch substrate according to claim 1, wherein the emitting electrode sub-patterns, the first receiving electrode sub-patterns and the second receiving electrode sub-patterns are all rectangular.

5. The touch substrate according to claim 1, wherein the emitting electrode sub-patterns are rectangular, rhombic and/or triangular, the first receiving electrode sub-patterns and the second receiving electrode sub-patterns are both triangular.

6. The touch substrate according to claim 1, further comprising:
a plurality of first receiving signal transmission lines correspondingly connected to the plurality of first receiving electrode patterns respectively;

a plurality of second receiving signal transmission lines correspondingly connected to the plurality of second receiving electrode patterns respectively; and
a plurality of drive signal transmission lines correspondingly connected to the plurality of emitting electrode patterns respectively;
wherein a quantity of the drive signal transmission lines is equal to a sum of a quantity of the first receiving signal transmission lines and a quantity of the second receiving signal transmission lines minus 1.

7. The touch substrate according to claim 1, wherein,
a first connection portion is between two adjacent first receiving electrode sub-patterns in a same first receiving electrode pattern,
a second connection portion is between two adjacent second receiving electrode sub-patterns in a same second receiving electrode pattern,
in an overlapping region of an orthographic projection of the first connection portion onto the base substrate and an orthographic projection of the second connection portion onto the base substrate, an insulation pad is arranged between the first connection portion and the second connection portion.

8. The touch substrate according to claim 1, wherein an insulation layer is arranged between the first receiving electrode pattern and the second receiving electrode pattern.

9. A touch display device, comprising a touch substrate;
wherein the touch substrate comprises:
a plurality of emitting electrode patterns arranged along a first direction, wherein each of the emitting electrode patterns comprises an emitting electrode sub-pattern or a plurality of electrically connected emitting electrode sub-patterns;
a plurality of first receiving electrode patterns arranged along a Y-direction, wherein each of the first receiving electrode patterns comprises a plurality of electrically connected first receiving electrode sub-patterns; and
a plurality of second receiving electrode patterns arranged along an X-direction and insulated from the first receiving electrode patterns, and each of the second receiving electrode patterns comprises a plurality of electrically connected second receiving electrode sub-patterns;
wherein the first direction intersects both the X-direction and the Y-direction, and the X-direction is perpendicular to the Y-direction;
wherein each of the emitting electrode sub-patterns corresponds to at least one of the first receiving electrode sub-patterns and at least one of the second receiving electrode sub-patterns, an orthographic projection of the at least one of the first receiving electrode sub-patterns onto a base substrate of the touch substrate and an orthographic projection of the at least one of the second receiving electrode sub-patterns onto the base substrate are independent from each other, and both of the orthographic projection of the at least one of the first receiving electrode sub-patterns onto the base substrate of the touch substrate and the orthographic projection of the at least one of the second receiving electrode sub-patterns onto the base substrate at least partially overlap with an orthographic projection of the corresponding emitting electrode sub-pattern onto the base substrate respectively.

10. A method of driving a touch substrate, wherein the touch substrate comprises:
a plurality of emitting electrode patterns arranged along a first direction, wherein each of the emitting electrode patterns comprises an emitting electrode sub-pattern or a plurality of electrically connected emitting electrode sub-patterns;
a plurality of first receiving electrode patterns arranged along a Y-direction, wherein each of the first receiving electrode patterns comprises a plurality of electrically connected first receiving electrode sub-patterns; and
a plurality of second receiving electrode patterns arranged along an X-direction and insulated from the first receiving electrode patterns, and each of the second receiving electrode patterns comprises a plurality of electrically connected second receiving electrode sub-patterns;
wherein the first direction intersects both the X-direction and the Y-direction, and the X-direction is perpendicular to the Y-direction;
wherein each of the emitting electrode sub-patterns corresponds to at least one of the first receiving electrode sub-patterns and at least one of the second receiving electrode sub-patterns, an orthographic projection of the at least one of the first receiving electrode sub-patterns onto a base substrate of the touch substrate and an orthographic projection of the at least one of the second receiving electrode sub-patterns onto the base substrate are independent from each other, and both of the orthographic projection of the at least one of the first receiving electrode sub-patterns onto the base substrate of the touch substrate and the orthographic projection of the at least one of the second receiving electrode sub-patterns onto the base substrate at least partially overlap with an orthographic projection of the corresponding emitting electrode sub-pattern onto the base substrate respectively,
the method comprising:
transmitting a drive signal to the emitting electrode pattern;
acquiring touch sensing signals through the first receiving electrode patterns and the second receiving electrode patterns; and
determining a touch position according to the touch sensing signals respectively acquired through the first receiving electrode patterns and the second receiving electrode patterns.

11. The method of driving the touch substrate according to claim 10, wherein the first receiving electrode patterns and the second receiving electrode patterns simultaneously acquire the touch sensing signals.

12. The method of driving the touch substrate according to claim 10, wherein prior to the transmitting the drive signal to the emitting electrode pattern, the driving method further comprises:
determining a quantity of touch points;
in the case that the quantity of the touch points is one, the transmitting the drive signal to the emitting electrode pattern comprises:
transmitting the drive signal to all the emitting electrode patterns on the touch substrate simultaneously.

13. The method of driving the touch substrate according to claim 10, wherein prior to the transmitting the drive signal to the emitting electrode pattern, the driving method further comprises:
determining a quantity of touch points;
in the case that the quantity of the touch points is more than one, taking an i-th emitting electrode pattern and an i+round[(M+N−1)/2]-th emitting electrode pattern on the touch substrate as a group to obtain a plurality of groups of emitting electrode patterns; wherein the M represents a quantity of the second receiving electrode patterns, the N represents a quantity of the first receiving electrode patterns, and the (M+N−1) represents a quantity of the emitting electrode patterns;

the transmitting the drive signal to the emitting electrode pattern comprises:

transmitting the drive signal to each of the groups of emitting electrode patterns in sequence, and simultaneously transmitting, when transmitting the drive signal to each of the groups of emitting electrode patterns, the drive signal to two emitting electrode patterns in the group.

\* \* \* \* \*